(12) United States Patent
Fenton et al.

(10) Patent No.: US 10,733,392 B2
(45) Date of Patent: Aug. 4, 2020

(54) SYSTEMS, APPARATUSES AND METHODS OF SUPPORTING PAYMENT TEST CARDS AND ROBOTICALLY TESTING CARD PAYMENT SYSTEMS

(71) Applicant: Walmart Apollo, LLC, Bentonville, AR (US)

(72) Inventors: Timothy M. Fenton, Bentonville, AR (US); Christopher D. Johnson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/109,460

(22) Filed: Aug. 22, 2018

(65) Prior Publication Data
US 2019/0065792 A1 Feb. 28, 2019

Related U.S. Application Data

(60) Provisional application No. 62/549,104, filed on Aug. 23, 2017.

(51) Int. Cl.
*G06Q 30/00* (2012.01)
*G06K 7/00* (2006.01)
(Continued)

(52) U.S. Cl.
CPC ....... *G06K 7/0095* (2013.01); *G05B 19/4155* (2013.01); *G06K 13/077* (2013.01);
(Continued)

(58) Field of Classification Search
CPC ........ G06K 13/00; G06K 13/02; G06K 13/04; G06K 13/06; G06K 13/07; G06K 13/077;
(Continued)

(56) References Cited

U.S. PATENT DOCUMENTS 3,507,064 A 4/1970 Hammero
4,907,889 A * 3/1990 Simone ............... G11B 15/688
360/92.1
(Continued)

FOREIGN PATENT DOCUMENTS

CN 106408040 2/2017

OTHER PUBLICATIONS amazon.com; "Marketing Holders 48 Pocket Wall Mount Business Card Display Holder"; https://www.amazon.com/Marketing-Holders-Pocket-Business-Display/dp/B00HS3KMYG/ref=pd_lpo_vtph_229_tr_img_3?_encoding=UTF8&psc=1&refRID=NGET8NHV7AXBVWOVNNK8; Retrieved on May 19, 2017; pp. 1.
(Continued)

*Primary Examiner* — Steven S Paik
*Assistant Examiner* — April A Taylor
(74) *Attorney, Agent, or Firm* — Fitch, Even, Tabin & Flannery LLP

(57) ABSTRACT

Some embodiments provide robotic multiple-slot test card support systems comprising: a test robot system comprising a robotic arm and an end-effector; and a first card support apparatus comprising: a plurality of lateral supports; a plurality of angled shelf supports each extending between a pair of the plurality of lateral supports defining an array of angled card slots, wherein the shelf supports along the columns are vertically separated and each comprises: a guide exterior surface and an interior surface configured to support a payment test card with at least a portion of a face of the test card being flush with the interior surface; wherein each card slot repeatedly positions the respective test card at substantially the same position within the card slot each time the test card is released by the end-effector enabling repeated accurate retrieval by the end-effector.

18 Claims, 9 Drawing Sheets

(51) Int. Cl.
*G05B 19/4155* (2006.01)
*G06Q 20/34* (2012.01)
*G06K 13/12* (2006.01)
*G06K 13/077* (2006.01)
*G06K 13/10* (2006.01)

(52) U.S. Cl.
CPC ............ *G06K 13/10* (2013.01); *G06K 13/12* (2013.01); *G06Q 20/34* (2013.01); *G05B 2219/31305* (2013.01)

(58) Field of Classification Search
CPC .... G06K 13/08; G06K 13/0806; G06K 13/10; G06K 13/103; G06K 13/12; G06Q 20/34
See application file for complete search history.

(56) References Cited

U.S. PATENT DOCUMENTS

| | | | |
|---|---|---|---|
| 5,105,069 A | 4/1992 | Hakenewerth | |
| 5,206,814 A | 4/1993 | Cahlander | |
| 6,072,766 A * | 6/2000 | Konshak | G11B 15/688 369/30.5 |
| 7,100,819 B1 * | 9/2006 | Green | G06Q 20/1085 235/375 |
| 7,996,174 B2 * | 8/2011 | Garcia | G11B 33/128 702/115 |
| 8,279,603 B2 | 10/2012 | Merrow | |
| 9,428,336 B2 * | 8/2016 | Hagen | G07F 11/165 |
| 9,779,780 B2 * | 10/2017 | Martino | G11B 33/128 |
| 10,134,027 B2 * | 11/2018 | Fenton | G06Q 20/341 |
| 10,265,872 B2 * | 4/2019 | Wagner | G08B 5/36 |
| 10,350,755 B2 * | 7/2019 | Wagner | B25J 9/1697 |
| 2008/0091601 A1 | 4/2008 | Green | |
| 2009/0297328 A1 * | 12/2009 | Slocum, III | B25J 9/0093 414/806 |
| 2014/0305847 A1 | 10/2014 | Kudrus | |

OTHER PUBLICATIONS amazon.com; "Wall Mount File Organizer by Fasthomegoods—Sturdy Modular Design with 5 Storage Folders"; Retrieved on May 19, 2017; pp. 1.
amazon.com; "Wall Mount Steel File Holder Organizer Rack Modular Design Wider Than Letter Size 13 Inches Multi-purpose Organize Display Magazines Sort Files and Folders 5 Sectional Black"; https://www.amazon.com/Organizer-Multi-purpose-Organize-Magazines-Sectional/dp/B015NLYFZQ; Retrieved on May 25, 2017; pp. 1-8.
Anglia Time Recorder; "Time Card Racks—Badge/Card Holders"; http:// www.timerecorders.co.uk/racks.php; 2005; pp. 1-6.
globalindustrial.com; "Swipe Card/Badge Rack"; https://www.globalindustrial.com/p/office-school-supply/clocks-time-clocks/time-attendance-clocks/swipe-card-badge-rack; Retrieved on May 19, 2017; pp. 1.
PCT; App. No. PCT/US2018/047243; International Search Report and Written Opinion dated Aug. 21, 2018.
timeclockexpress.com; "card holder"; http://www.timeclockexpress.com/media/ecom/prodsm/lg_12bb_2.jpg; Retrieved on May 19, 2017; pp. 1.

* cited by examiner

SYSTEMS, APPARATUSES AND METHODS OF SUPPORTING PAYMENT TEST CARDS AND ROBOTICALLY TESTING CARD PAYMENT SYSTEMS

CROSS-REFERENCE TO RELATED APPLICATION

This application claims benefit of U.S. Provisional Application No. 62/549,104, filed Aug. 23, 2017, which is incorporated herein by reference in its entirety.

TECHNICAL FIELD

This invention relates generally robotic testing of card payment systems.

BACKGROUND

There are many types of retail payment machines. These machines are repeatedly used over time by numerous customers. The reliability and consistency of these machines is critical to customer satisfaction and completing sales. Accordingly, there is a need to ensure the reliability of these machines and their use.

BRIEF DESCRIPTION OF THE DRAWINGS

Disclosed herein are embodiments of systems, apparatuses and methods pertaining to supporting test cards and robotically testing card payment systems. This description includes drawings, wherein.

Figure 1:
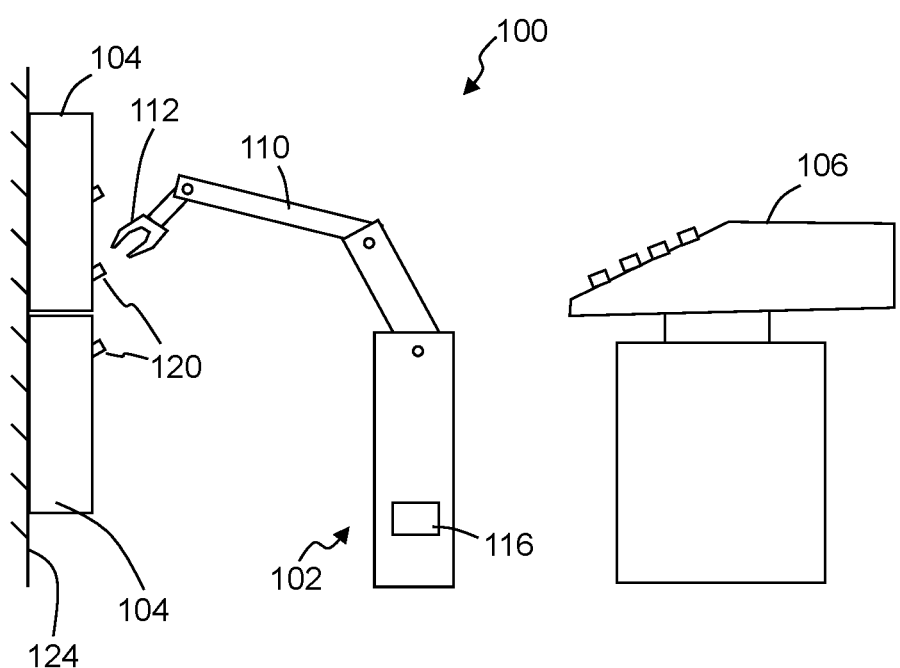
FIG. 1 illustrates a simplified block diagram of an exemplary robotic multiple-slot test card support system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to support test cards that are to be repeatedly retrieved and used by a test robot system in testing a card payment system. Some embodiments provide a robotic multiple-slot test card support system, comprising: a test robot system comprising a robotic arm and an end-effector secured at a distal end of the robotic arm; a first card support apparatus cooperated within a threshold distance with the robotic arm to be reachable by the end-effector, wherein the first card support apparatus comprises: a plurality of lateral supports spaced along a length of the first card support apparatus; a plurality of angled shelf supports each extending between two of the plurality of lateral supports defining an array of angled card slots comprising multiple rows and columns of the card slots, wherein the shelf supports along each of the columns of card slots are vertically separated by a threshold distance and each comprises: an guide exterior surface and an interior surface configured to support one of a plurality of payment test cards with at least a portion of a face of the respective test card being flush with the interior surface when positioned within a respective one of the card slots; wherein each card slot repeatedly positions the respective test card at substantially the same position within the card slot each time the test card is released by the end-effector enabling repeated accurate retrieval by the end-effector. The card support apparatus in part provides precise positioning of the payment test cards to enable the test robot system to repeatedly retrieve and return the test cards for repeated testing of one or more card payment systems.

FIG. 1 illustrates a simplified block diagram of an exemplary robotic multiple-slot test card support system 100, in accordance with some embodiments. The test card support system 100 includes a test robot system 102 and one or more card support apparatuses 104, with a card payment system 106 positioned within a first reach threshold distance of the test robot system 102. The robot system 102 includes at least one robotic arm 110 and at least one end-effector 112 secured at a distal end of the robotic arm. Further, the one or more card support apparatuses 104 are cooperated within a second reach threshold distance with the robotic arm 110 to be reachable by the end-effector 112.

In operation, the robot system 102 can control the robotic end-effector 112 and position the end-effector relative to a card support apparatus 104 to retrieve and return payment test cards supported by the card support apparatus. The test robot system 102 includes one or more robot control systems 116 that controls at least the end-effector 112. Additionally or alternatively, the test robot system is in wired and/or wireless communication with a remote control system that provides at least some control and/or programming to the robot control system. The test robot system can, for example, be controlled to interact with card detection and/or reader systems of the card payment system 106 to be tested, such as to repeatedly insert a test payment card into a card slot, slid a test payment card along a payment slide guide, and/or other such interactions. Because the testing is automated through the robot system, the card payment system 106 can be tested for an extended period of time, and/or repeatedly tested multiple different times. The robot system 102 can repeatedly retrieve and return test payment cards from and to the card support apparatus 104 in testing the card payment system 106.

Figure 2:
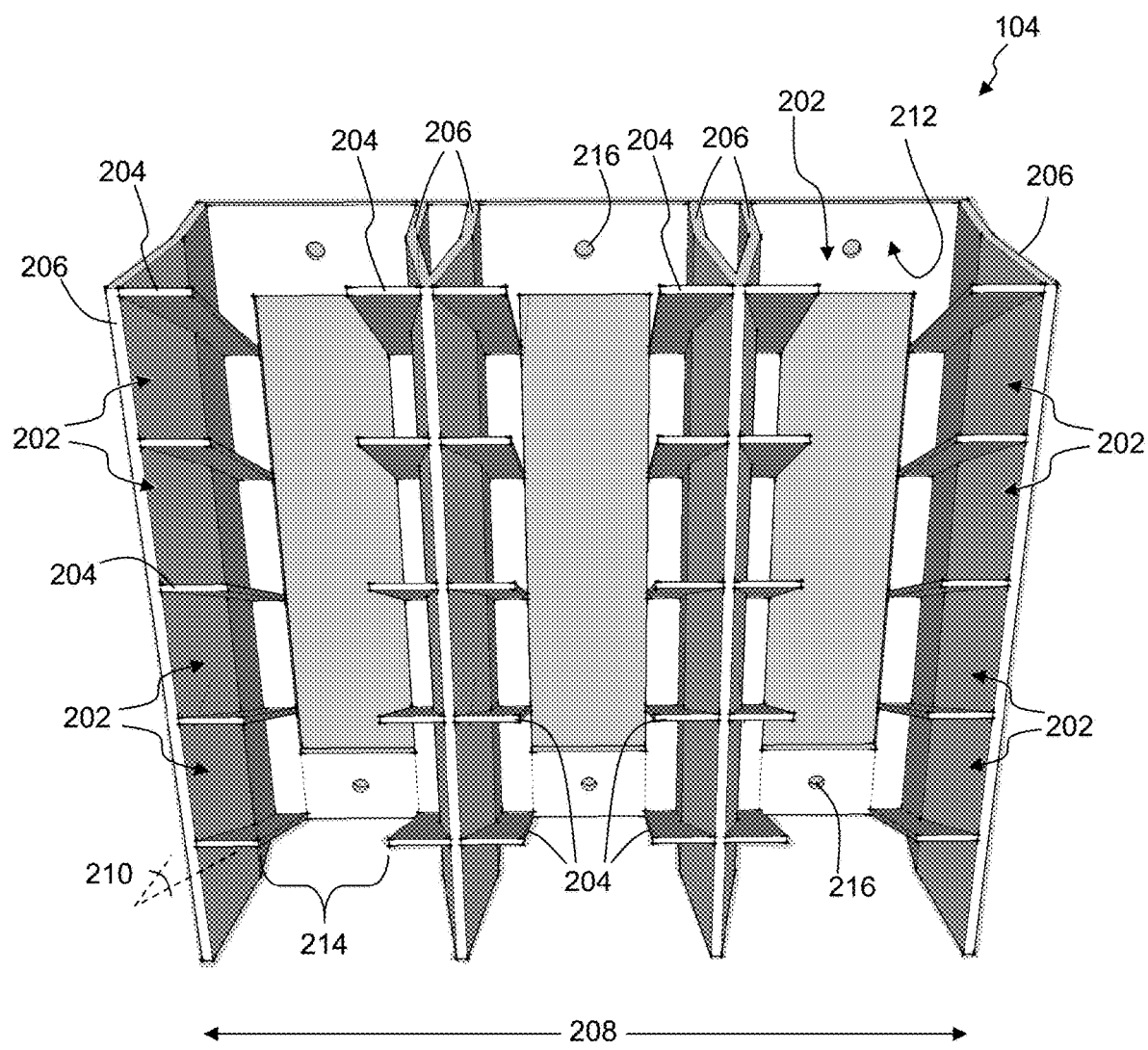
FIG. 2 illustrates a simplified perspective view of an exemplary card support apparatus, in accordance with some embodiments.
Figure 3:
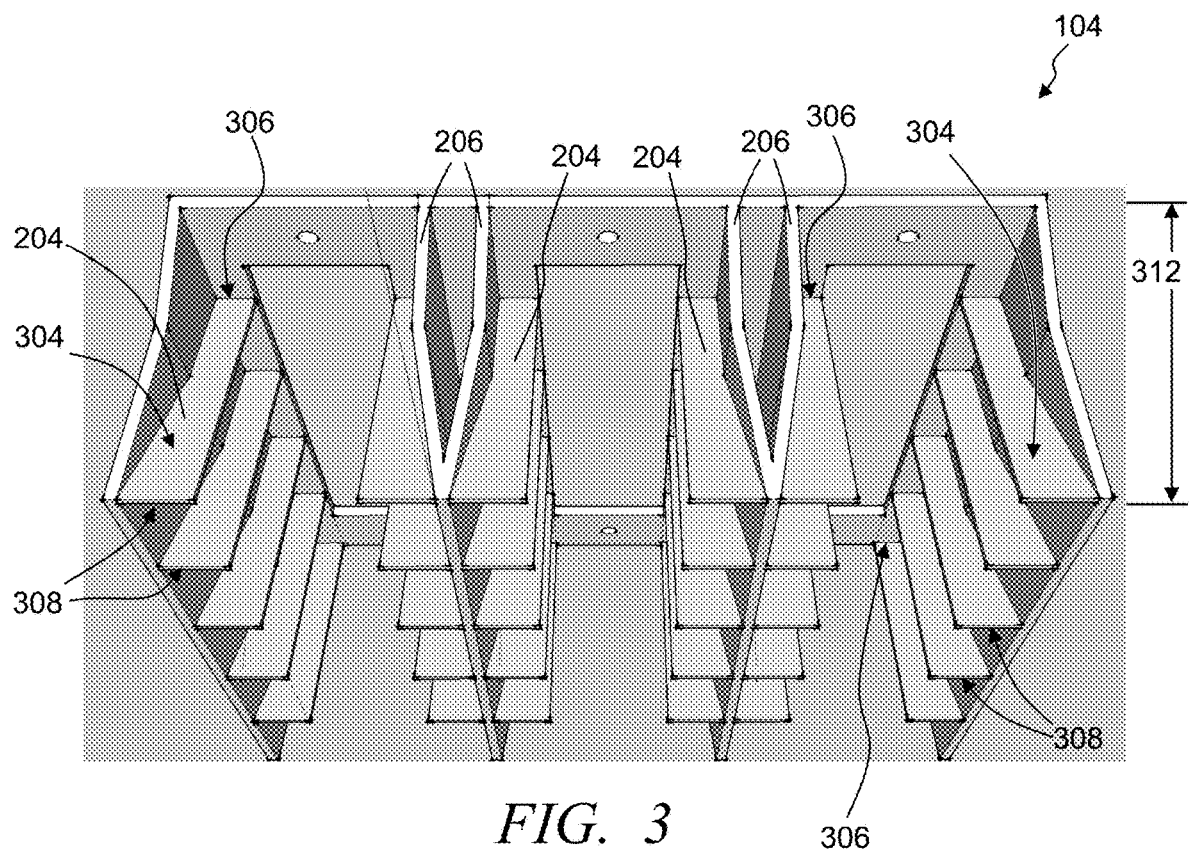
FIG. 3 illustrates a simplified overhead perspective view of an exemplary card support apparatus, in accordance with some embodiments.
Figure 4:
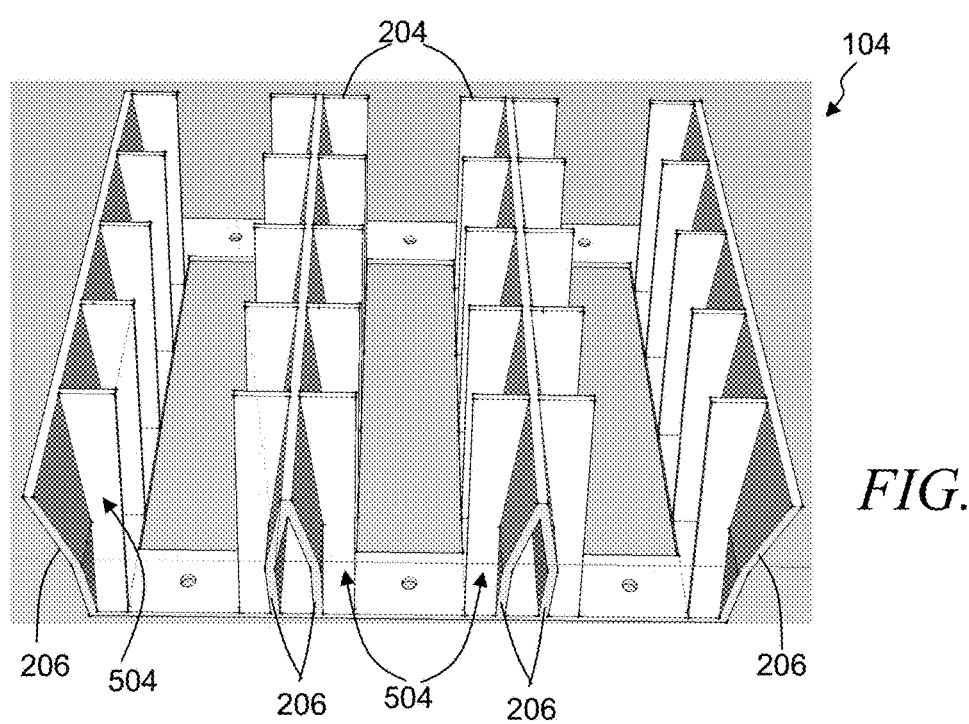
FIG. 4 illustrates a simplified under-side view of an exemplary card support apparatus, in accordance with some embodiments.
Figure 5:
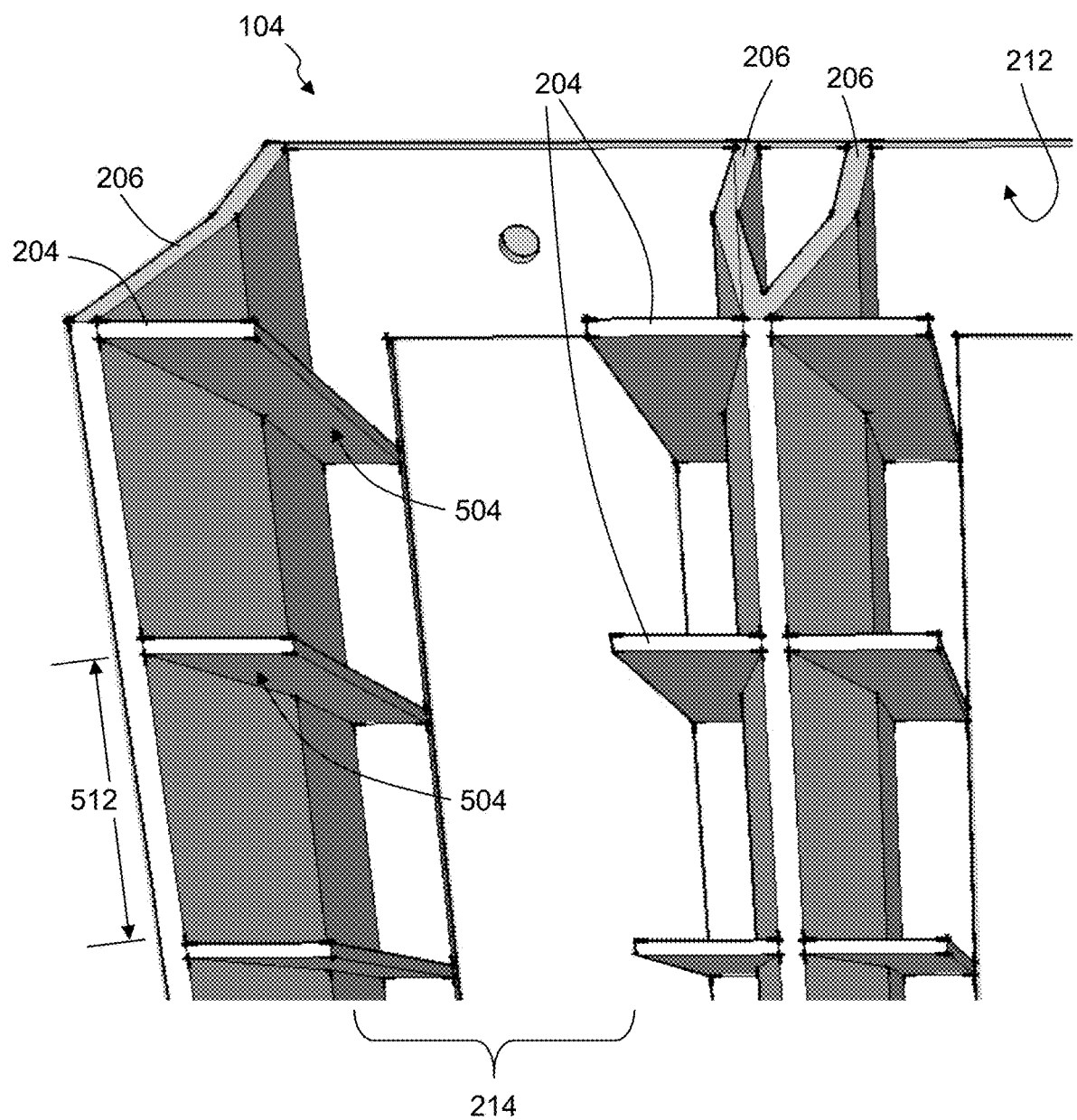
FIG. 5 illustrates a simplified zoom-in view of a portion of the card support apparatus of FIG. 1, in accordance with some embodiments.
Figure 6:
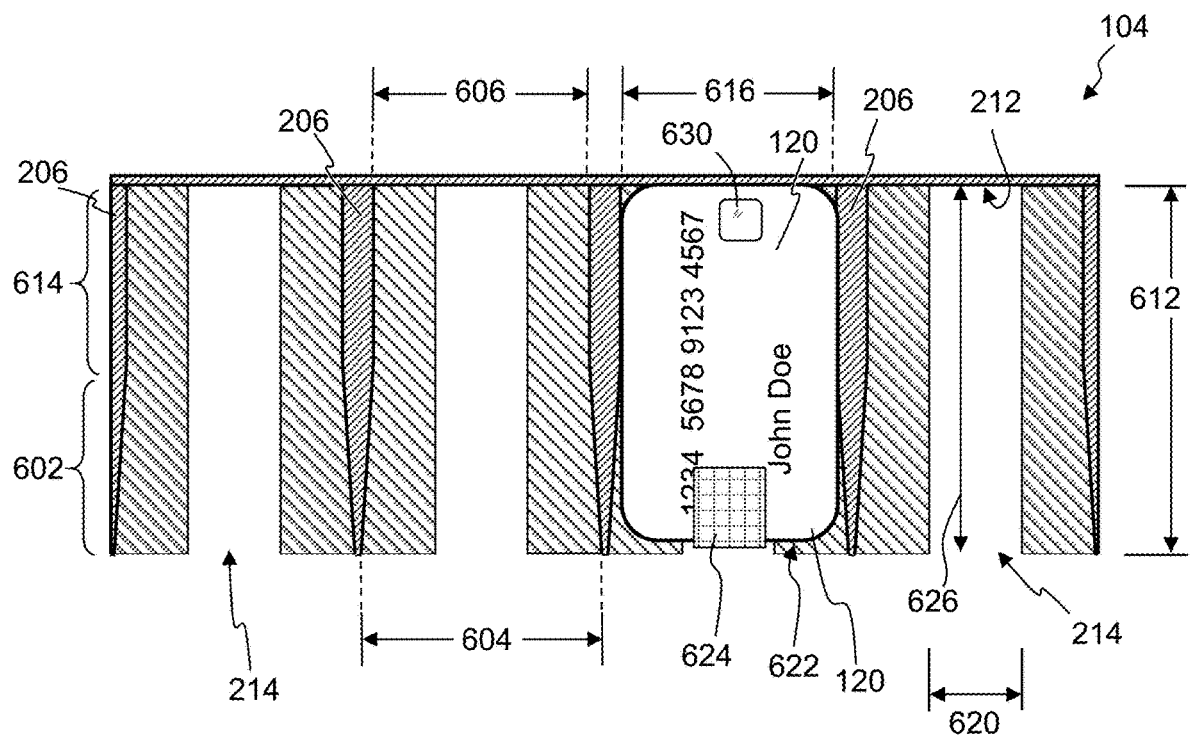
FIG. 6 illustrates a simplified block diagram overhead view of an exemplary card support apparatus, in accordance with some embodiments.

FIG. 2 illustrates a simplified perspective view of an exemplary card support apparatus 104, in accordance with some embodiments. FIG. 3 illustrates a simplified overhead perspective view of an exemplary card support apparatus 104, in accordance with some embodiments. FIG. 4 illustrates a simplified under-side view of an exemplary card support apparatus 104, in accordance with some embodiments. FIG. 5 illustrates a simplified zoom-in view of a portion of the card support apparatus 104 of FIG. 1, in accordance with some embodiments. FIG. 6 illustrates a simplified block diagram overhead view of an exemplary card support apparatus 104, in accordance with some embodiments. Referring to FIGS. 1-6, on some embodiments, the card support apparatus 104 includes an array of card slots 202 formed by shelf supports 204, which are typically secured with one or more lateral supports 206 of a plurality of lateral supports 206 spaced along a length 208 of the card support apparatus 104. In some applications, each of the plurality of shelf supports 204 extends from at least one lateral supports 206 and between two of the plurality of lateral supports 206 defining one of the array of card slots 202.

The array of card slots comprises one or more rows and one or more columns of the card slots 202. The shelf supports 204 of each column of card slots are vertically separated by a distance 512, and typically separated by at least a slot separation threshold distance. Further, the shelf supports 204 each include a guide exterior surface 504 and an interior surface 304. The interior surfaces are configured to support one of a plurality of payment test cards 120 with at least a portion of a face of the respective test card being flush with the interior surface 304 when the payment test card is positioned within a respective one of the card slots 202. Further, the interior surfaces 304 provide a precise vertical position of the payment test card being supported, and the precise vertical position can be defined within the robot control system 116 for use by the robot control system in positioning the end-effector when retrieving the payment test card 120 to be used in testing the card payment system 106.

The slot separation threshold distance between vertically adjacent and separated card slots 202 is defined, at least in part, according to the dimensions of the end-effector 112. Accordingly, the card slots 202 are vertically separated by a sufficient distance to allow the end-effector of the test robot system 102 to move into position and grip or clamp a payment test card 120 without dislodging other payment test cards supported by neighboring card slots, and typically without contacting other payment test cards 120 or shelf supports 204 of other card slots 202. In some implementations, the vertical separation between vertically adjacent shelf supports is defined to allow the end-effector of the test robot system to extend at least partially into the card slot and beyond an outer edge of a test card 120.

In some embodiments, the shelf supports 204 are positioned at an angle 210 having a back lower edge 306 being vertically lower than a front upper edge 308 with the lower edge 306 being positioned adjacent a back 212 of the card support apparatus 104. Further, the upper edge 308 is separated from the back 212 of the card support apparatus 104 by at least an end-effector depth threshold enabling a portion of the end-effector 112 to extend at least partially beyond the upper edge 308 and into the card slot and beyond an outer edge of a test card 120. Further, in some embodiments the angle 210 of the shelf supports 204 aids in repeatedly providing a precision positioning of the test card 120 when placed and repeatedly returned to the card slot by the test robot system 102.

In some embodiments, the test robot system 102 takes advantage of gravity and can release the test card 120 when placing the test card into the card slot prior to the test card contacting the back 212 of the card support apparatus 104 and/or prior to a downward facing face of the test card being flush in contact with an interior surface 304 of the shelf support 204. The release of the test card 120 prior to contacting the back 212 and/or prior to being flush in contact with the interior surface 304 allows the test card to fall into the card slot to a precise position with a back edge of the test card contacting the back 212 of the card support apparatus and the downward facing face of the test card being flush with the interior surfaces 304 if one or more shelf supports 204 defining and card slot 202 and supporting the test card 120. Further, the angle 210 provides a margin of error for the test robot system in returning the test card 120 to the card slot 202 by taking advantage of gravity to precisely return the test card to the intended precise position. The angle 210 is configured to be sufficiently step to allow the test card to slide along the interior surfaces of the shelf supports through gravitational force while still allowing the robotic arm 110 and end-effector 112 to approach and grasp a test card 120. In some embodiments, the angle 210 is limited to between 15-70 degrees, while in other instances the angle may be between 10-80 degrees. In many embodiments, for example, the angle is limited to between 30-45 degrees allowing the robotic arm to move the end-effector in a more horizontal approach to the test card while allowing reduced vertical separation between vertically adjacent card slots 202. For example, in some implementations, the test robot system 102 is configured to move a test card 120, while placing the test card into a card slot, at a down angle relative to horizontal of less than 35 degrees.

Further, in some embodiments, the test robot system 102 in placing a test card 120 into a first lower card slot 202 takes advantage of the angled guide exterior surface 504 of the shelf supports 204 of an upper card slot vertically adjacent to and above the lower card slot. The guide exterior surface 504 of the upper card slot guides the test card down into the lower card slot 202 if and when the test card contacts the guide exterior surface 504 as the robotic arm 110 is placing the test card 120 into the lower card slot. In some embodiments, the angle of the guide exterior surface 504 can be the same as the angle 210 of the interior surface 304, while in other embodiments, the angle of the guide exterior surface 504 can be greater to enhanced guidance of the test card directing the test card down into the lower card slot. The shelf supports 204 may be solid, while in other instances, may be formed partially or fully hollow with the hollow portion(s) separating the interior surface 304 from the guide exterior surface 504. Further, the angled guide exterior surface 504 allows the angle at which the robotic arm 110 moves the card toward and into the lower card slot 202 to be closer to horizontal or even substantially horizontal. In some embodiments, the robotic arm 110 includes one or more sensors that detect the change in downward force applied by the guide exterior surface 504 as the test card contacts the guide exterior surface and uses the force to guide the continued angle of movement, and/or adjusts to reduce a vertical resistance on the robotic arm and/or end-effector to allow the end-effector and test card to lower into the lower card slot without the robot system having to control the precise angle of the robot arm.

The lateral supports 206 may, in some implementations, additionally or alternatively aid in directing the repeated precision positioning of the test card into the card slot 202. In some embodiments, the exterior surfaces of the lateral supports 206 include tapered portions 602 that taper along at least a front portion of a depth 612 of the lateral supports. The tapering of the tapered portions 602 of the lateral supports is inward toward the card slot 202 and toward an opposed lateral support of the card slot. As such, an opening length 604 of an opening of each of the card slots 202 has a length greater than a back length 606 of the card slot along a back of the card slot. The back length 606 is configured to correspond to a dimension of the test card 120. In some instances, the back length 606 is within a threshold variation of the width 616 of the test card and positions the test card laterally at a precise position within the threshold variation. For example, in some embodiments the back length 606 is less than 5 mm and typically less than 3 mm of the width 616 of the test card 120, and in some implementations the back length 606 is 0.5 mm or less than the width 616 of the test card.

The cooperation between pairs of front tapered portions 602 of a card slot provides a greater opening into which the robotic arm 110 directs the test card 120 when placing the test card into the card slot, which provides a greater margin of error in the robot system aligning the test card with the intended card slot. Further, the front tapered portions 602 of the lateral supports aid in guiding the test card 120 into the desired precise positioning of the test card when positioned within the card slot. Additionally, in some embodiments, the back portion of the card slot proximate the back 212 provides a margin of error in lateral or horizontal precision placement of the test card of less than 3 mm and in many embodiments less than 0.5 mm. In some embodiments, at least a portion of a depth of the back portion of a pair of lateral supports 206 defining a card slot may comprise a non-tapered depth and/or parallel portions 614. The parallel portions 614, in some implementations, extend from the front tapered portions 602 and along at least a back portion of the depth 612 of the lateral supports 206. The parallel portions 614 can be proportional to a length of the test card to provide the desired positioning of the test card and limit or avoid misalignment of the test card with the card slot and/or achieve substantially a parallel alignment between a back edge of the test card and the back 212 of the card support apparatus 104, again improving the precise positioning of the test card when in the card slot 202.

The cooperation between the front tapered portions 602 of the lateral supports 206 and the shelf supports 204 being positioned at the angle 210 provides a funneling relative to the respective card slot, and further causes, for each card slot, the test card 120 to be precisely positioned repeatedly at substantially the same position within the card slot 202 each time the test card is released by the end-effector 112 including when the test card is released prior to the test card being in contact with the interior surface 304 of a shelf support 204 and/or the back 212 of the card slot. Further, in some applications the guide exterior surface 504 of the shelf support above the card slot 202 further aids in the funneling of the test card 120 as the robotic arm 110 places the test card into the card slot. Accordingly, the card slots are configured with numerous alignment characteristics that aid in funneling and/or aligning the test card in to substantially the same position, within a minimal margin of error (e.g., less than 1.0 mm, and often less than 0.1 mm), each time the card is placed in a card slot by the robot system 102.

The shelf supports 204 can have a depth that is substantially equal to that of the depth 312 of the card slots 202. In other embodiments, however, the depths of the shelf supports may be less than a depth of the card slot, while still having a sufficient depth to support and maintain the position of the test card when positioned within a card slot. In some embodiments some, a card slot includes a single shelf support 204, while in other instances, two or more shelf supports may be cooperated within a card slot. For example, some embodiments include a pair of shelf supports within each card slot and extending along respective lateral supports 206. In other implementations, one or more card slots may include a single shelf support 204 that extends across the length of the card slot. One or more apertures, gaps, grooves or the like may be formed in one or more of the shelf supports 204. Further, when a card slot includes multiple shelf supports, the multiple shelf supports of a card slot may have different widths from each other, and/or their widths may vary along a depth.

In some embodiments, each card slots 202 further include at least one end-effector grip gap 214. The grip gaps 214 are defined by at least one of the shelf supports 204 and extends along at least a portion of the depth 312 of the card slot 202. Typically, the grip gaps have a width 620 sufficient to allow at least the ends of the end-effector 112 to extend beyond the front upper edge 308 of the card slot 202 and beyond an outer edge 622 of a test card 120 and along a portion of a length of the test card to be positioned to grip the test card for removal without contacting a shelf support 204 and/or extend beyond the front upper edge 308 when placing the test card in the card slot. The grip gaps 214 have a depth 626 that extend at least a portion of the depth of the shelf supports and depth 312 of the card slot 202. In some embodiments, the grip gaps extend only a portion of the depth 312, while in other implementations, one or more of the grip gaps may extend the entire depth of the card slot, which in part reduces the amount of material used in constructing the card support apparatus 104. Further, the width 620 of the grip gaps can be configured taking into consideration the tapering of the lateral supports 206 such that the grip gap may similarly narrow along at least a portion of its depth 626. Additionally, in some applications a narrowest width of the grip gap further along the tapered lateral support within the card slot is sufficiently wide to allow the end-effector 112 to extend at least partially within the card slot 202 and grip the test card (and/or end-effector grip 624) without contacting the shelf support. The grip gaps may be formed through a recess or cut-out from one or more of the shelf supports 204, formed by a separation between two shelf supports 204 of a card slot 202, or the like that allows the end-effector 112 to be positioned on opposite sides of the test card 120 and to grip or clamp the card without contacting a shelf support 204.

The thickness of some payment test cards 120 may not be sufficient to allow some end-effectors 112 to effectively grip the test card and/or to accurately hold the test card with sufficient precision to accurately perform the testing of the card payment system 106. Accordingly, some embodiments further enable the use of one or more end-effector grips 624 enabling the end-effector 112 of the test robot system 102 to more securely grip the test card. The end-effector grip 624 is configured to be positioned on the test card to provide an enhanced thickness to the test card enabling the end-effector 112 to more readily grip and hold the test card 120 while utilizing the test card to test a system, such as the card payment system 106. In some implementations, the end-effector grip 624 is secured along an edge and/or corner of the respective test card and having a thickness greater than a thickness of the respective test card. For example, some embodiments utilize end-effector grips or card grip apparatuses described in U.S. Provisional Application No. 62/424,705, filed Nov. 21, 2016, for Timothy M. Fenton et al., entitled ROBOTIC PAYMENT GRIP APPARATUS AND METHOD OF USE, which is incorporated in its entirety herein by reference.

Some embodiments further configure the end-effector grip gap 214 to accommodate the end-effector grips 624. As such, the end-effector grip gap 214 can be configured with a width 620 that is greater than a width of the expected end-effector grip 624 to be used with the test card. Further, in some implementations, the depth of the end-effector grip gap 214 is configured to be greater than a length of the end-effector grip 624. This allows the end-effector grip 624 to be positioned within the end-effector grip gap without inhibiting the face of the respective test card 120 from being flush with and in contact with the respective interior surfaces 304 of at least one shelf support 204 when the test card is positioned within the respective card slot 202. As described above, the grip gap 214 enables the positioning of the end-effector 112 of the robot system so that at least a portion of the end-effector 112 can extend beyond the front upper edge 308 of the card slot 202 and beyond the outer edge 622 of a test card 120 and along a portion of a length of the test card, and thus be positioned to grip the end-effector grip 624 and/or test card 120 when removing or returning the test card without the end-effector 112 contacting a shelf support 204. Further, the shelf supports 204 are positioned at the angle 210 with a lower edge 306 of the shelf support being positioned adjacent the back 212 of the card support apparatus 104, and the upper edge 308 of the shelf support is separated by an end-effector depth threshold from the back 212 of the card support apparatus enabling the end-effector 112 to extend beyond an upper edge of the end-effector grip 624 and the outer edge 622 of the test card 120 when positioned in the respective slot without contacting the exterior surface 504 of a shelf support 204 above the respective card slot from which the test card is being retrieved or to which the test card is being returned.

In some embodiments, the grip gaps 214 of at least a set of the card slots 202 of a card support apparatus 104 are positioned separated from the lateral supports 206, and in some instances are positioned proximate a lateral or horizontal center of each of the set of card slots. This generally central orientation of the grip gaps 214 supports the use of a first type of end-effector grip 624 that is configured to be positioned along the edge 622 of the test card 120. For example, some end-effector grips 624 are intended to be positioned proximate a center of the width of a test card when the test card is a chip test card that is used by the test robot system 102 to test an authentication chip 630 or other payment authentication portion of the test card exposed and not covered by end-effector grip 624. Test cards having authentication chips 630 may sometimes be referred to as chip test cards. Other embodiments utilize corner end-effector grips 724 configured to be positioned on a corner of the test card. For example, some corner end-effector grips 724 are intended to be positioned over a corner of the width of the test card when the test card is a swipe test card that is used by the test robot system 102 to test an authentication strip (not shown) or other payment authentication portion (e.g., positioned along a portion of a length of the test card proximate a side of the test card opposite from the corner on which the corner end-effector grip is positioned), such that the authentication strip is exposed and not covered by corner end-effector grip 724.

Figure 7:
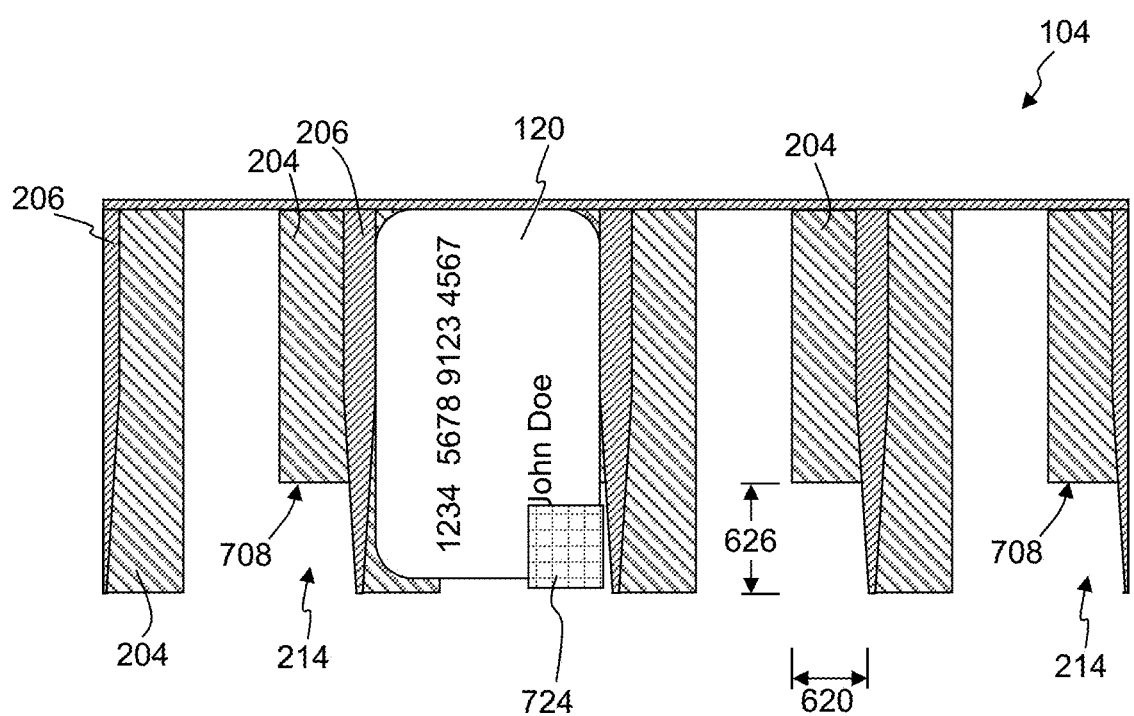
FIG. 7 illustrates a simplified block diagram overhead view of an exemplary card support apparatus, in accordance with some embodiments.
Figure 8:
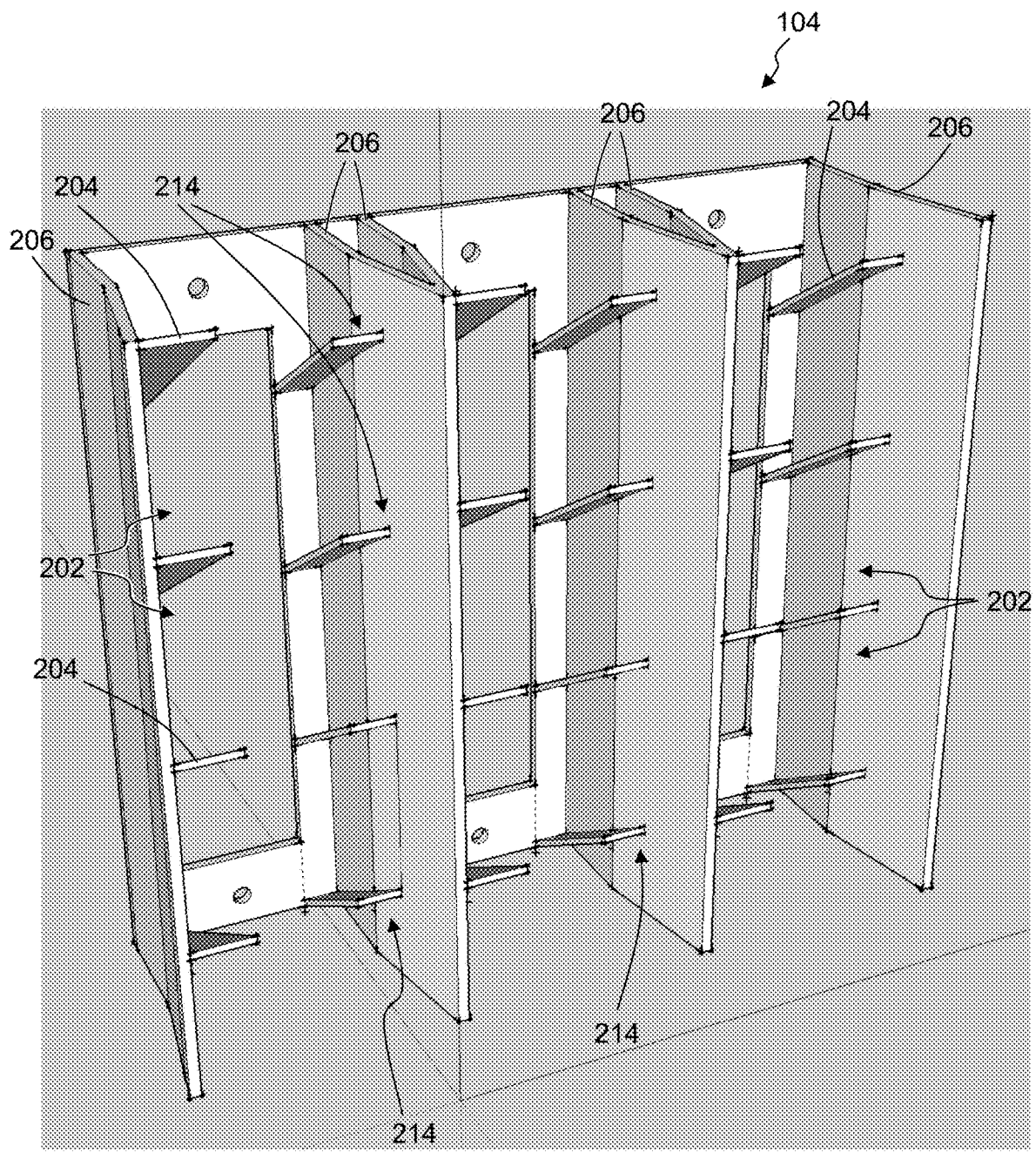
FIG. 8 illustrates a simplified perspective view of the exemplary card support apparatus of FIG. 7, in accordance with some embodiments.
Figure 9:
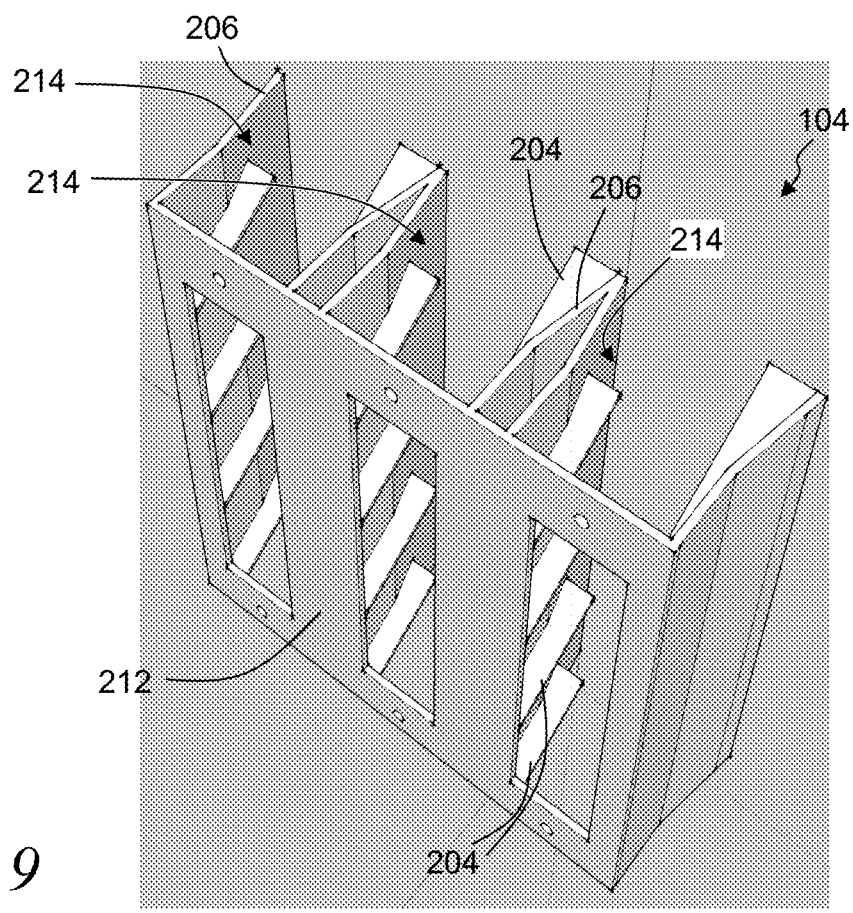
FIG. 9 illustrates a simplified overhead perspective view of the exemplary card support apparatus of FIG. 7, in accordance with some embodiments.
Figure 10:
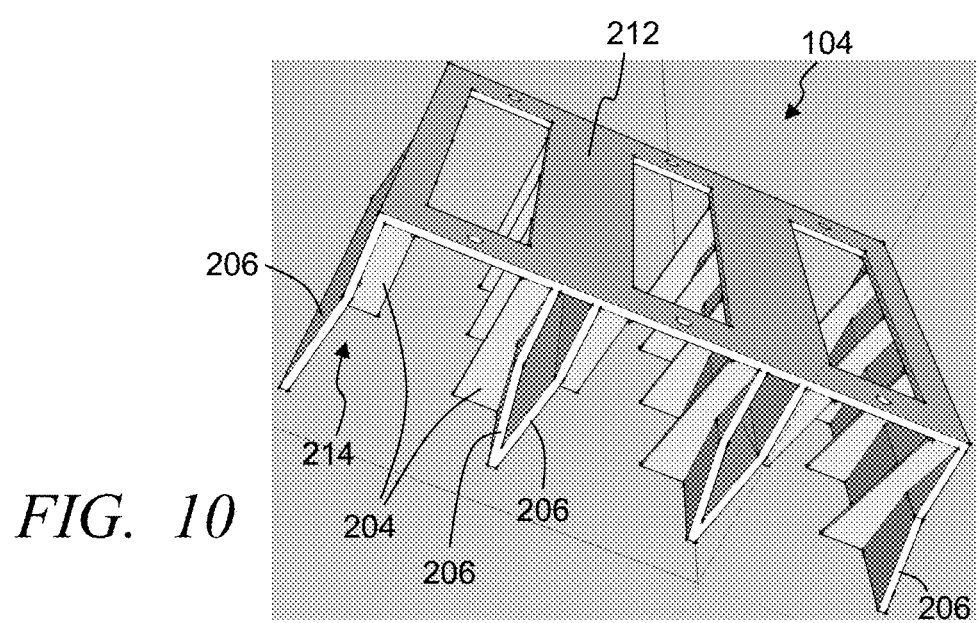
FIG. 10 illustrates a simplified under-side view of the exemplary card support apparatus of FIG. 7, in accordance with some embodiments.

FIG. 7 illustrates a simplified block diagram overhead view of an exemplary card support apparatus 104 having grip gaps 214 positioned proximate to or adjacent a lateral support 206, in accordance with some embodiments. FIG. 8 illustrates a simplified perspective view of the exemplary card support apparatus 104 of FIG. 7, in accordance with some embodiments. FIG. 9 illustrates a simplified overhead perspective view of the exemplary card support apparatus 104 of FIG. 7, in accordance with some embodiments. FIG. 10 illustrates a simplified under-side view of the exemplary card support apparatus 104 of FIG. 7, in accordance with some embodiments. Referring to FIGS. 7-10, in some embodiments the grip gaps 214 is positioned to enable the end-effector 112 to be positioned to grip the test card 120 at a different location to implement testing using a payment authentication portion of the test card, such as a magnetic strip extending along at least a portion of a back side surface of the test card (e.g., the face of the test card that contacts and is flush with the interior surface 304 of the shelf support 204.

Further, the grip gap 214 can be configured to accommodate a corner end-effector grip 724, such that the width 620 of the grip gap 214 is greater than a width of the end-effector grip 214. In some implementations, a depth 626 of the grip gap 214 is greater than a depth of the end-effector grip 724 such that the end-effector grip fits within the grip gap 214. The tapering of the lateral supports 206 may further be configured to be tapered at such an angle to ensure that the test card 120 accurately aligns with the parallel portions of the card slot, and that the end-effector grip 724 does not interfere with that precision alignment. In some embodiments, the tapered portion of the lateral support 206 is tapered at an angle that ensures the end-effector grip 724 does not contact the lateral support 206 when the test card is positioned within the card slot. For example, the tapering of the tapered portions 602 can be defined so that the lateral support does not interfere with the parallel portions 614 and the back 212 of the card slot from precisely engaging the sides of the test card for precise positioning. Further, the tapering of the lateral supports does not adversely affect that precise alignment when the end-effector grip 724 is secured along the corner and/or side of the test card, thus the angle of tapering takes into consideration the added width by the end-effector grip 724 relative to the distance from the grip to the start of the parallel portion 614. Further, the width 620 of the grip gaps can be configured taking into consideration the tapering of the lateral supports 206 such that the grip gap may similarly narrow along at least a portion of its depth 626. Additionally, in some applications a narrowest width of the grip gap further along the tapered lateral support within the card slot is sufficiently wide to allow the end-effector 112 to extend at least partially within the card slot 202 and grip the test card (and/or end-effector grip 624) without contacting the shelf support. In some embodiments, the grip gap is formed from a cut-out of a shelf support 204. The depth 626 of the grip gap extends at least a portion of the depth of the shelf supports and depth 312 of the card slot 202.

In some embodiments, the grip gaps 214 of a set of one or more of the card slots 202 of card support apparatus 104 are positioned adjacent one of the lateral supports 206 of the set of card slots each configured to support swipe test cards. Typically, the test cards a positioned within the card slot 202 so that the authentication strip is positioned away from the grip gap 214 (e.g., on an opposite side of the card slot). Further, swipe test cards may each have an end-effector grip 724 positioned proximate a corner of the swipe test cards. In some embodiments, each card slot 202 of the set of card slots of an array of card slots can include a pair of shelf supports 204 separated by a distance along at least a portion of a length 604. A first shelf support of the pair of shelf supports of each of the set of card slots can be configured with a front end 708 that is recessed along a depth of the card slot from a front end of the respective lateral support 206 from which it extends defining a recessed area. The recessed area defines the respective end-effector grip gap 214 adjacent the respective lateral support.

In some embodiments, the lateral supports 206 are hollow and/or are formed from walls that extend from the front end toward the back 212, and taper away from each other establishing a cavity or hollow portion between adjacent lateral supports of adjacent columns of card slots 202. This hollow portion, in part, reduces the amount material used in constructing the card support apparatus 104, and can reduce a weight of the card support apparatus. The reduced material in constructing the card support apparatus can be particularly advantageous with some manufacturing techniques and/or some materials used to construct the card support apparatus. For example, in some embodiments, the card support apparatus 104 is three-dimensionally (3D) printed. By reducing the material the printing time can be significantly reduced, while further providing significant cost savings.

The card support apparatus 104 can be constructed from substantially any relevant material having the structural integrity to receive and support the test cards. For example, the card support apparatus may be constructed from plastic, polylactic acid (PLA), Acrylonitrile butadiene styrene (ABS), plastics, carbon fiber impregnated PLA, rubber, silicon, aluminum, other metals, carbon fiber, fiberglass, wood, other such materials, or combination of two or more of such materials. In some instances, some or all of the card grip apparatus may be formed from layering of materials cooperatively merge forming the portions or all of the card grip apparatus. Further, in some embodiments, the card grip apparatus or portions of the card grip apparatus can be formed through 3D printing processes. In other implementations, the card grip apparatus or portions of the support apparatus may be manufactured through injection molding, machining, other such methods, or combination of two or more of such methods. In some implementations, the 3D printing provides rapid prototyping and a relatively inexpensive cost while still achieving the high precision (e.g., 0.5 millimeter margin of error precision), and producing a card grip apparatus with intended thickness and/or material thresholds such that at least the shelf supports have a break threshold that is less than a robot damage threshold. As such, at least the shelf supports, and in some instances the lateral supports, will break in response to a force by the end-effector 112 before that force is expected to cause damage to the robot system 102, robotic arm 110 and/or end-effector 112.

In some implementations, the card support apparatus 104 includes a back 212 that extends at least between lateral supports, in some instances extends at least across portions of the card slots, and some embodiments extends along a length 208 of the card support apparatus. The back can be solid across the back, while in other implementations may include one or more apertures, gaps, openings, or the like. For example, in some embodiments, the back comprises at least one opening between adjacent lateral supports of each of the columns of card slots. Each card slot of an array of card slots can include a pair of aligned shelf supports 204 that are separated by a distance (e.g., the grip gap 214) along at least a portion of a depth of the shelf supports and/or the card slot In some embodiments, at least some of the lateral supports 206 are hollow along at least a portion of their height. The card support apparatus 104, in some embodiments, includes multiple lateral supports 206 that define multiple columns each having a set of card slots 202, with card slots of each set being vertically spaced along the height of the card support apparatus. The back 202 may be included, which may extend along a length of the card support apparatus.

In some embodiments, the multiple lateral supports 206 can comprise first and second outside lateral supports, and a set of multiple inner lateral supports. The set of multiple inner lateral supports, in some implementations, comprise opposing mirrored tapered walls that extend from the front edge away from each other and extending into opposing parallel walls that are secured with the back 202. In some embodiments, the shelf supports 204 are contiguous with the lateral supports 206 and extend from the lateral supports. In other embodiments, one or more of the shelf supports 204 may be removable from the lateral supports 206 and/or the card support apparatus 104. For example, in some embodiments, the lateral supports 206 and/or the back 212 are formed with shelf grooves or channels that are configured to receive shelf supports slid into the grooves, and to rigidly maintain the position of the shelf supports while the card support apparatus 104 is in use. In some embodiments, the lateral supports 206 and/or the back 212 include shelf grooves that receive shelf supports allowing rapid and easy replacement of a broken shelf support. Further, the grooves allow for multiple different configurations and/or spacing between vertically separated card slots. In some implementations, the lateral supports 206 and/or the back 212 have an increased thickness to increase the depth of the shelf grooves and provide enhanced support for the shelf supports.

The shelf supports 204 can have a depth that is equal to the lateral supports. Further, in some applications, the shelf supports may have a depth that is greater than the length of the card, while in some embodiments, may be less than a length of the test card such that a portion of the card extends beyond the edge of the shelf supports 204. In some embodiments, the shelf supports 204 are positioned at an angle relative to floor on which the robot system 102 and/or the card payment system 106 are supported. A lower edge 306 of the shelf support can be positioned adjacent the back 212 and an upper edge 308 of the shelf support can be separated by an end-effector depth threshold from the lower edge 306 and/or the back 212. In some embodiments, the end-effector depth threshold enables the end-effector 112 of the robot system to extend beyond an upper edge of both a respective end-effector grip 624, 724 and an upper outer edge 622 of a respective test card when the test card is positioned in the respective card slot 202 without contacting the guide exterior surface 504 of a shelf support above the respective card slot. The card slots are configured to repeatedly and consistently funnel the test cards into a precise, predefined position. Further, the shelf supports are angled to take advantage of gravity to aid in achieving the precise placement of the test card, while further enabling the robotic arm 110 and end-effector 112 to approach at a reduced angle (e.g., an angle less than the angle of the shelf support relative to horizontal, such as the floor or other support surface upon which the robot system 102 is positioned). Accordingly, each card slot is configured to repeatedly guide a test card to position the test card at substantially the same position within the card slot each time the test card is released by the end-effector enabling repeated accurate retrieval by the end-effector. Additionally, in some implementations, the card slots are configured to provide 360 degree funneling surrounding the perimeter of the card slots. In some embodiments, test card 120 may be positioned fully within a card slot 202, while in other embodiments the depth of the card slot is less than the length of the test card such that a portion of the test card extends out of the card slot.

In some embodiments, the card support apparatuses 104 are constructed to readily mount to a wall 124 or other surface. The card support apparatus may, for example, include one or more mounting apertures 216 configured to receive a screw, bolt, nail, hook or other mounting device. Further, the card support apparatus can be constructed to align with and be mounted adjacent one or more other card support apparatus to provide an array of aligned card support apparatuses. As such, some embodiments provide a set of card support apparatuses 104 including two or more cards support apparatuses that are cooperatively positioned adjacent each other. For example, a first cards support apparatus may be positioned abutted to and below a second card support apparatus and configured such that exterior surfaces 504 of each of the set of lowest shelf supports 204 of the second card support apparatus operate to guide respective test cards into one of a set of top card slots 202 of the first card support apparatus as the robot system returns the respective card to one of the top card slots of the first card support apparatus.

In some embodiments, the card support apparatuses 104 may include one or more alignment structures and/or coupling structures configured to align two or more card support apparatuses together and/or at least temporarily secure two or more card support apparatuses together. For example, the alignment structures and/or coupling structures may include one or more protrusions and corresponding apertures or recesses, tongue and grooves, snap-fit couplers, retractable pins and corresponding apertures, alignment tabs, threaded protrusions, bolts, other such alignment and/or coupling structures, or a combination of such alignment and/or coupling structures. In some instances, the alignment and/or coupling structures are formed as part of the body of the card support apparatus (e.g., formed in one or more lateral supports 206, the back 212, or the like. Further, in some embodiments, the card support apparatuses can be configured as stackable or readily cooperated, which in part allows for a card support apparatus to be easily replaced in an event of a shelf support or other portion of the card support apparatus breaking (e.g., a set of 4×4 card support apparatus (four columns and four rows of card slots 202) that snap together to form desired number of card slots; where if one breaks it can be pull out and replaced).

In an exemplary embodiment, the tapered portions 602 are each tapered out 5 mm relative to respective parallel portions 614 so that the tapered portions are configured to achieve an opening length 604 that is about 10 mm greater than the back length 606 along the parallel portions 614, which can take into account movement margins of tolerance of the robot system 102 (e.g., a 2 mm tolerance). The shelf supports 204 may be configured with a 35 mm drop from the front upper end 308 of the shelf supports to the back lower edge 306. This allows the card slot to compensate for the 2 mm tolerance (Left to Right) as well as the ability of the robot system to drop the test card 120 in the card slot while the test card returns to a predefined precision position from which the robot system can re-grasp repeatedly. In continuing with the exemplary embodiment, the vertical measurement or separation 512 between the card slots is equal to or greater than about 35 mm to allow room for the end-effector 112 to grasp each card individually. It is noted, however, that is vertical separation distance can be modified depending on the type of end-effectors used, the angle over the shelf supports, the angle at which the end-effectors are directed to grasp the test card, the dimensions of the aperture used to grasp the test card, and/or other such factors. The overall length and width (and thus size) of the card support apparatus 104 is typically only limited by the type of equipment used to manufacture. In a representative example, a card support apparatus may be 3D printed with a 250 mm length and 250 mm width. Again, the card support apparatuses 104 can be constructed to allow alignment between two or more card support apparatuses allowing card support apparatuses to be placed next to, as well as above and below, to allow for an increase in the amount of test cards held.

In some embodiments, shelf grooves may be formed in the lateral supports to receive shelf supports. For example, shelf grooves may be formed or etched at 5 mm intervals to allow for custom adjustments of the shelf supports. Again, the card support apparatus can include one or more card slots 202 configured for one or more types of test cards having one or more types of payment authentication (e.g., chip, magnetic strip, etc.). For example, with magnetic strip style test cards, because of the location of the magnetic strip on the test card, the grip gap 214 may be oriented on the opposite side of the card slot from where the magnetic strip is to be positioned. This allows the end-effector 112 to grip the card in a location that will not interfere with the swiping of the test card in the card payment system 106 being tested. In an exemplary implementation, for example, the grip gap 214 has a depth of approximately 30 mm by removing 30 mm of a shelf support 204 allowing the test card to be placed in the card slot while allowing the test card to lay flush with and supported by the remaining portion of the shelf support (e.g., 50 mm) and the other shelf support 204 of the pair of shelf supports (e.g., along the full 80 mm depth). Because the precision placement of the test cards and the supported stability of the test cards, the robot system can grasp the test card with near 100% accuracy and repeatability.

Figure 11:
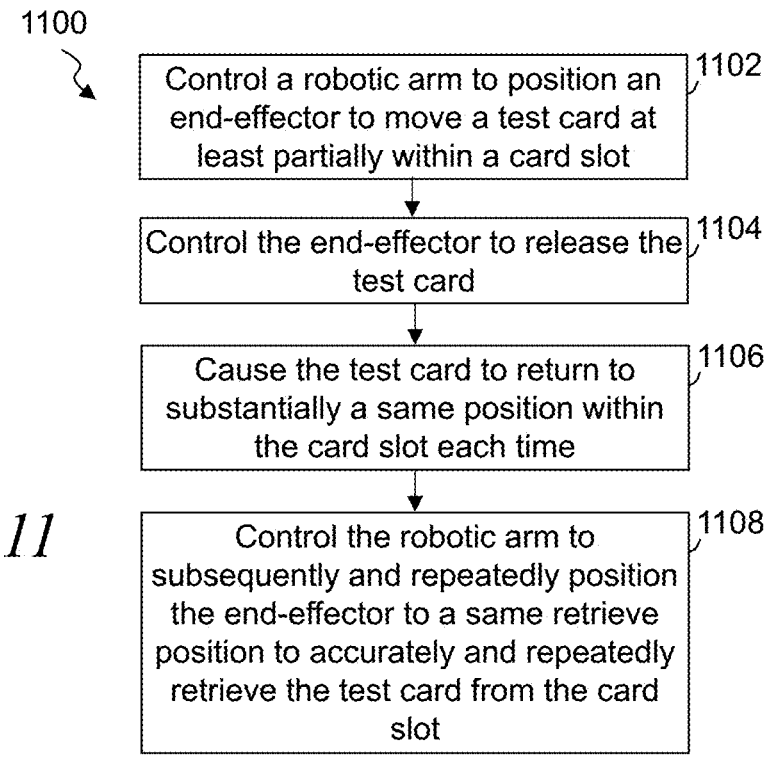
FIG. 11 illustrates a simplified flow diagram of an exemplary process of repeatedly and accurately retrieving one or more test cards and robotically testing card payment systems, in accordance with some embodiments.

FIG. 11 illustrates a simplified flow diagram of an exemplary process 1100 of repeatedly and accurately retrieving one or more test cards 120 and robotically testing card payment systems 106, in accordance with some embodiments. In step 1102, a robotic arm 110 of a test robot system 102 is controlled to position the end-effector 112, which is secured at a distal end of the robotic arm, to move a payment test card 120 at least partially within a card slot 202 of a card support apparatus 104. The card support apparatus is typically cooperated within a threshold distance with the robotic arm and comprises an array of angled card slots 202. In some embodiments, the array of card slots comprises multiple rows and columns of the card slots.

In step 1104, the end-effector is controlled to release the test card 120 while the test card is at least partially within a card slot 202 of the card support apparatus 104. In step 1106, the test card is caused to return to substantially a same position within the card slot. In some instances, the return is caused at least in part by lateral supports 206 on opposite sides of the card slot defining lateral sides of the card slot. Further, the alignment of the card within the card slot may further be achieved based on one or more angled shelf support 204 of the card slot. Additionally, the test card can repeatedly be returned to substantially the same position each time the test card is released by the end-effector 112. In some instances, an end-effector grip 624, 724 may be secured along one or more edges of the test card, and typically has a thickness greater than a thickness of the test card. In returning the test card, the end-effector grip is positioned within an end-effector grip gap 214 without inhibiting a face of the test card from resting flush with and in contact with an interior surface 304 of one or more shelf supports 204 of the card slot. In some embodiments, the grip gap 214 is formed in the shelf support and extends along at least a portion of a depth 312 of the card slot.

In step 1108, the robotic arm 110 is controlled to subsequently and repeatedly position the end-effector 112 to a same retrieve position to accurately and repeatedly retrieve the test card 120 from the card slot 202 with the test card being in substantially the same position every time the test card is retrieved. Some embodiments, in controlling the end-effector to release the test card cause the end-effector 112 to release the test card while the test card is not in contact with the interior surface 304 of the shelf support 204 such that a cooperation of a tapering of at least one of the lateral sides and an angle 210 of the shelf support relative to horizontal of the card slot at least in part produces the precise positioning of the test card to substantially the same position. The control of the robotic arm 110 in returning the test card to the card slot can be controlled to move the test card at a down angle relative to horizontal (e.g., the ground) of less than 35 degrees. Some embodiments control the robotic arm 110 in retrieving the test card 120 to position the end-effector 112 to align with the end-effector grip 624, 724. The end-effector 112 can be controlled to clap the end-effector grip cooperated with the test card.

Figure 12:
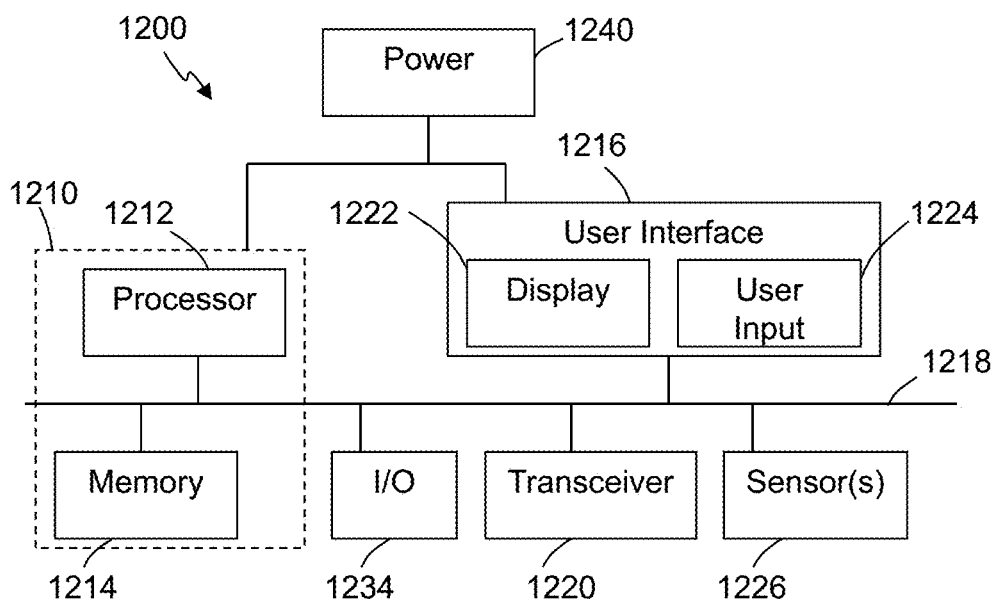
FIG. 12 illustrates an exemplary system for use in implementing methods, techniques, devices, apparatuses, systems, servers, and sources, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 12 illustrates an exemplary system 1200 that may be used for implementing any of the components, circuits, circuitry, systems, functionality, apparatuses, processes, or devices of the robot system 102, the one or more robot control systems 116, and/or other above or below mentioned systems or devices, or parts of such circuits, circuitry, functionality, systems, apparatuses, processes, or devices. However, the use of the system 1200 or any portion thereof is certainly not required.

By way of example, the system 1200 may comprise a control circuit or processor module 1212, memory 1214, and one or more communication links, paths, buses or the like 1218. Some embodiments may include one or more user interfaces 1216, and/or one or more internal and/or external power sources or supplies 1240. The control circuit 1212 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1212 can be part of control circuitry and/or a control system 1210, which may be implemented through one or more processors with access to one or more memory 1214 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1200 may be used to implement one or more of the above or below, or parts of, components, circuits, systems, processes and the like.

The user interface 1216 can allow a user to interact with the system 1200 and receive information through the system. In some instances, the user interface 1216 includes a display 1222 and/or one or more user inputs 1224, such as buttons, touch screen, track ball, keyboard, mouse, etc., which can be part of or wired or wirelessly coupled with the system 1200. Typically, the system 1200 further includes one or more communication interfaces, ports, transceivers 1220 and the like allowing the system 1200 to communicate over a communication bus, a distributed computer and/or communication network (e.g., a local area network (LAN), the Internet, wide area network (WAN), etc.), communication link 1218, other networks or communication channels with other devices and/or other such communications or combination of two or more of such communication methods. Further the transceiver 1220 can be configured for wired, wireless, optical, fiber optical cable, satellite, or other such communication configurations or combinations of two or more of such communications. Some embodiments include one or more input/output (I/O) ports 1234 that allow one or more devices to couple with the system 1200. The I/O ports can be substantially any relevant port or combinations of ports, such as but not limited to USB, Ethernet, or other such ports. The I/O interface 1234 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1226 to provide information to the system and/or sensor information that is communicated to another component. The sensors can include substantially any relevant sensor, such as distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, rotary encoders, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1200 comprises an example of a control and/or processor-based system with the control circuit 1212. Again, the control circuit 1212 can be implemented through one or more processors, controllers, central processing units, logic, software and the like. Further, in some implementations the control circuit 1212 may provide multiprocessor functionality.

The memory 1214, which can be accessed by the control circuit 1212, typically includes one or more processor readable and/or computer readable media accessed by at least the control circuit 1212, and can include volatile and/or non-volatile media, such as RAM, ROM, EEPROM, flash memory and/or other memory technology. Further, the memory 1214 is shown as internal to the control system 1210; however, the memory 1214 can be internal, external or a combination of internal and external memory. Similarly, some or all of the memory 1214 can be internal, external or a combination of internal and external memory of the control circuit 1212. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 1214 can store code, software, executables, scripts, data, content, lists, programming, programs, log or history data, user information, customer information, product information, and the like. While FIG. 12 illustrates the various components being coupled together via a bus, it is understood that the various components may actually be coupled to the control circuit and/or one or more other components directly.

In some embodiments, robotic multiple-slot test card support systems are provided. Some of these systems comprise: a test robot system comprising a robotic arm and an end-effector secured at a distal end of the robotic arm; and a first card support apparatus cooperated within a threshold distance with the robotic arm to be reachable by the end-effector, wherein the first card support apparatus comprises: a plurality of lateral supports spaced along a length of the first card support apparatus; a plurality of angled shelf supports each extending from at least one of a pair of lateral supports and extending between the pair of the plurality of lateral supports defining an array of angled card slots comprising multiple rows and columns of the card slots, wherein the shelf supports along each of the columns of card slots are vertically separated by a threshold distance and each comprises: a guide exterior surface and an interior surface configured to support one of a plurality of payment test cards with at least a portion of a face of the respective test card being flush with the interior surface when positioned within a respective one of the card slots; wherein each card slot repeatedly positions the respective test card at substantially the same position within the card slot each time the test card is released by the end-effector enabling repeated accurate retrieval by the end-effector.

Some embodiments provide methods of robotically testing card payment systems, comprising: controlling a robotic arm of a test robot system to position an end-effector, secured at a distal end of the robotic arm, to move a payment test card at least partially within a first card slot of a first card support apparatus cooperated within a threshold distance with the robotic arm and comprising an array of angled card slots comprising multiple rows and columns of the card slots including the first card slot; controlling the end-effector to release the first test card while the first test card is at least partially within the first card slot; and causing the first test card, by lateral sides and an angle shelf support of the first card slot, to return to substantially a same position within the card slot each time the test card is released by the end-effector with an end-effector grip, secured along an edge of the first test card and having a thickness greater than a thickness of the first test card, to be positioned within an end-effector grip gap without inhibiting a face of the first test card from resting flush with and in contact with an interior surface of the shelf support, wherein the end-effector grip gap is formed in the shelf support and extends along at least a portion of a depth of the first card slot; and controlling the robotic arm to subsequently and repeatedly position the end-effector to a same retrieve position to accurately and repeatedly retrieve the first test card from the first card slot with the first test card being in substantially the same position every time the first test card is retrieved.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. A robotic multiple-slot test card support system, comprising:
  a test robot system comprising a robotic arm and an end-effector secured at a distal end of the robotic arm; and
  a first card support apparatus cooperated within a threshold distance with the robotic arm to be reachable by the end-effector, wherein the first card support apparatus comprises:
    a plurality of lateral supports spaced along a length of the first card support apparatus; and
    a plurality of angled shelf supports each extending from at least one of a pair of lateral supports and extending between the pair of the plurality of lateral supports defining an array of angled card slots comprising multiple rows and columns of the card slots, wherein the shelf supports along each of the columns of card slots are vertically separated by a threshold distance and each comprises: a guide exterior surface and an interior surface configured to support one of a plurality of payment test cards with at least a portion of a face of a respective test card being flush with the interior surface when positioned within a respective card slot;
  wherein each card slot repeatedly positions the respective test card at substantially the same position within the card slot each time the test card is released by the end-effector enabling repeated accurate retrieval by the end-effector;

wherein the shelf supports are positioned at an angle with a lower edge of each of the shelf supports being positioned adjacent a back; and wherein the lateral supports of each of the card slots taper along at least a front tapered portion of a depth of the lateral supports toward an opposed lateral support of the card slot such that an opening length of an opening of each of the card slots has a length greater than a length of the card slot along a back of the card slot, wherein a cooperation between the front tapered portions of the lateral supports of the card slot and the shelf support of the card slot being positioned at the angle causes, for each of the card slots, the test card to be precisely positioned repeatedly at substantially the same position within the card slot each time the test card is released by the end-effector including when the test card is released prior to the test card being in contact with the interior surface.

2. The card support system of claim 1, wherein each of the card slot comprises an end-effector grip gap defined by at least one of the shelf supports and extends along at least a portion of a depth of the card slot enabling an end-effector grip, secured along an edge of the respective test card and having a thickness greater than a thickness of the respective test card, to be positioned within the end-effector grip gap without inhibiting the face of the respective test card from being flush with and in contact with the respective interior surface of at least one shelf support when the respective test card is positioned within the respective card slot.

3. The card support system of claim 2, wherein the shelf supports are positioned at the angle with an upper edge of each of the shelf supports being separated by an end-effector depth threshold from the back enabling the end-effector to extend beyond an upper edge of both a respective end-effector grip and the respective test card when positioned in the respective card slot without contacting the exterior surface of a shelf support above the respective card slot.

4. The card support system of claim 3, wherein the test robot system, in placing a first test card of the plurality of test cards into a first card slot of the array of card slots, moves the first test card at a down angle relative to horizontal of less than 35 degrees.

5. The card support system of claim 1, wherein the lateral supports comprise parallel portions extending from the front tapered portions and along at least a back portion of the depth of the lateral supports.

6. The card support system of claim 1, wherein the end-effector grip gaps of at least a set of the card slots of the first card support apparatus are positioned proximate a center of each of the card slots of the first card support apparatus to support chip test cards having the end-effector grips positioned proximate a center of a width of the chip test cards.

7. The card support system of claim 1, wherein the end-effector grip gaps of at least a set of the card slots of the first card support apparatus are positioned adjacent one of the lateral supports of the set of card slots to support swipe test cards having the end-effector grips positioned proximate a corner of the swipe test cards.

8. The card support system of claim 7, wherein each card slot of the set of card slots of the array of card slots comprises a pair of shelf supports separated by a distance along at least a portion of a length, wherein a first shelf support of the pair of shelf supports of each of the set of card slots comprises a front end that is recessed from a front end of a respective lateral support from which it extends defining a recessed area, wherein the recessed area defines the respective end-effector grip gap adjacent the respective lateral support.

9. The card support system of claim 1, further comprising a set of card support apparatuses including the first card support apparatus and a second card support apparatus cooperatively positioned below the first card support apparatus and configured such that exterior surfaces of each of a set of lowest shelf supports of the first card support apparatus operate to guide respective test cards into one of a set of top card slots of the second card support apparatus as the robot system returns the respective card.

10. The card support system of claim 1, wherein the first card support apparatus comprises:

a back extending along a length of the first card support apparatus and comprises at least one opening between adjacent lateral supports of each of the columns of card slots;

wherein each card slot of the array of card slots comprises a pair of aligned shelf supports separated by a distance along at least a portion of a length; and wherein at least some of the lateral supports are hollow along at least a portion of their height.

11. The card support system of claim 1, wherein the first card support apparatus comprises:

a back extending along a length of the first card support apparatus; and wherein the plurality of lateral supports comprise first and second outside lateral supports and a set of multiple inner lateral supports, wherein the set of multiple inner lateral supports each comprise two lateral supports that comprise opposing mirrored tapered walls that extend from a front edge and away from the other of the two lateral supports, and extend into opposing parallel walls that are secured with the back.

12. A method of robotically testing card payment systems, comprising:

controlling a robotic arm of a test robot system to position an end-effector, secured at a distal end of the robotic arm, to move a payment test card at least partially within a first card slot of a first card support apparatus cooperated within a threshold distance with the robotic arm and comprising an array of angled card slots comprising multiple rows and columns of the card slots including the first card slot;

controlling the end-effector to release a first test card while the first test card is at least partially within the first card slot; and causing the first test card, by lateral sides and an angle of a shelf support of the first card slot, to return to substantially a same position within the card slot each time the test card is released by the end-effector with an end-effector grip, secured along an edge of the first test card and having a thickness greater than a thickness of the first test card, to be positioned within an end-effector grip gap without inhibiting a face of the first test card from resting flush with and in contact with an interior surface of the shelf support, wherein the end-effector grip gap is formed in the shelf support and extends along at least a portion of a depth of the first card slot, and wherein the lateral sides of the first card slot taper along at least a front tapered portion of a depth of the lateral sides toward an opposed lateral side of the first card slot such that an opening length of an opening of the first card slot has a length greater than a length of the first card slot along a back of the first card slot, wherein a cooperation between the front tapered portions of the lateral sides of the first card slot and the shelf support of the first card slot being positioned at the angle causes the first test card to be precisely positioned repeatedly at substantially the same position within the first card slot each time the first test card is released by the end-effector including when the first test card is released prior to the first test card being in contact with the interior surface; and controlling the robotic arm to subsequently and repeatedly position the end-effector to the same retrieve position to accurately and repeatedly retrieve the first test card from the first card slot with the first test card being in substantially the same position every time the first test card is released by the end-effector.

13. The method of claim 12, wherein the controlling the end-effector to release the first test card comprises causing the end-effector to release the first test card while the first test card is not in contact with the interior surface of the shelf support such that the cooperation of the tapering of at least one of the lateral sides and the angle of the shelf support relative to horizontal of the first card slot produces the precise positioning of the first test card to substantially the same position.

14. The method of claim 13, wherein the controlling the robotic arm comprises controlling the robotic arm in returning the first test card to move the first test card at a down angle relative to horizontal of less than 35 degrees.

15. The method of claim 12, further comprising:
controlling the robotic arm in retrieving the first test card to position the end-effector to align with the end-effector grip, and controlling the end-effector to clap the end-effector grip cooperated with the first test card.

16. A card support system comprising:
a plurality of lateral supports spaced along a length of the first card support apparatus; and
a plurality of angled shelf supports each extending from at least one of a pair of lateral supports and extending between the pair of the plurality of lateral supports defining an array of angled card slots comprising multiple rows and columns of the card slots, wherein the shelf supports along each of the columns of card slots are vertically separated by a threshold distance and each comprises: a guide exterior surface and an interior surface configured to support one of a plurality of payment test cards with at least a portion of a face of a respective test card being flush with the interior surface when positioned within a respective card slot;
wherein each card slot repeatedly positions the respective test card at substantially the same position within the card slot each time the test card is released into the card slot;
wherein the shelf supports are positioned at an angle with a lower edge of each of the shelf supports being positioned adjacent a back; and
wherein the lateral supports of each of the card slots taper along at least a front tapered portion of a depth of the lateral supports toward an opposed lateral support of the card slot such that an opening length of an opening of each of the card slots has a length greater than a length of the card slot along a back of the card slot, wherein a cooperation between the front tapered portions of the lateral supports of the card slot and the shelf support of the card slot being positioned at the angle causes, for each of the card slots, the test card to be precisely positioned repeatedly at substantially the same position within the card slot each time the test card is released including when the test card is released prior to the test card being in contact with the interior surface.

17. The card support system of claim 16, wherein each of the card slot comprises a pair of shelf supports within each card slot and separated by an end-effector grip gap that extends along a depth of the card slot, wherein each shelf support of the pair of shelf supports of a card slot extend along opposing lateral supports of the card slot.

18. The card support system of claim 17, wherein a front end of a first shelf support of a first pair of shelf supports of a first card slot is recessed along the depth of the card slot relative to an opening of the first card slot and a front end of a second shelf support of the first pair of shelf supports of the first card slot.

* * * * *